Dec. 2, 1941.   T. OLSEN ET AL   2,264,917
WATER HOSE GUIDE AND PROTECTOR
Filed June 17, 1940
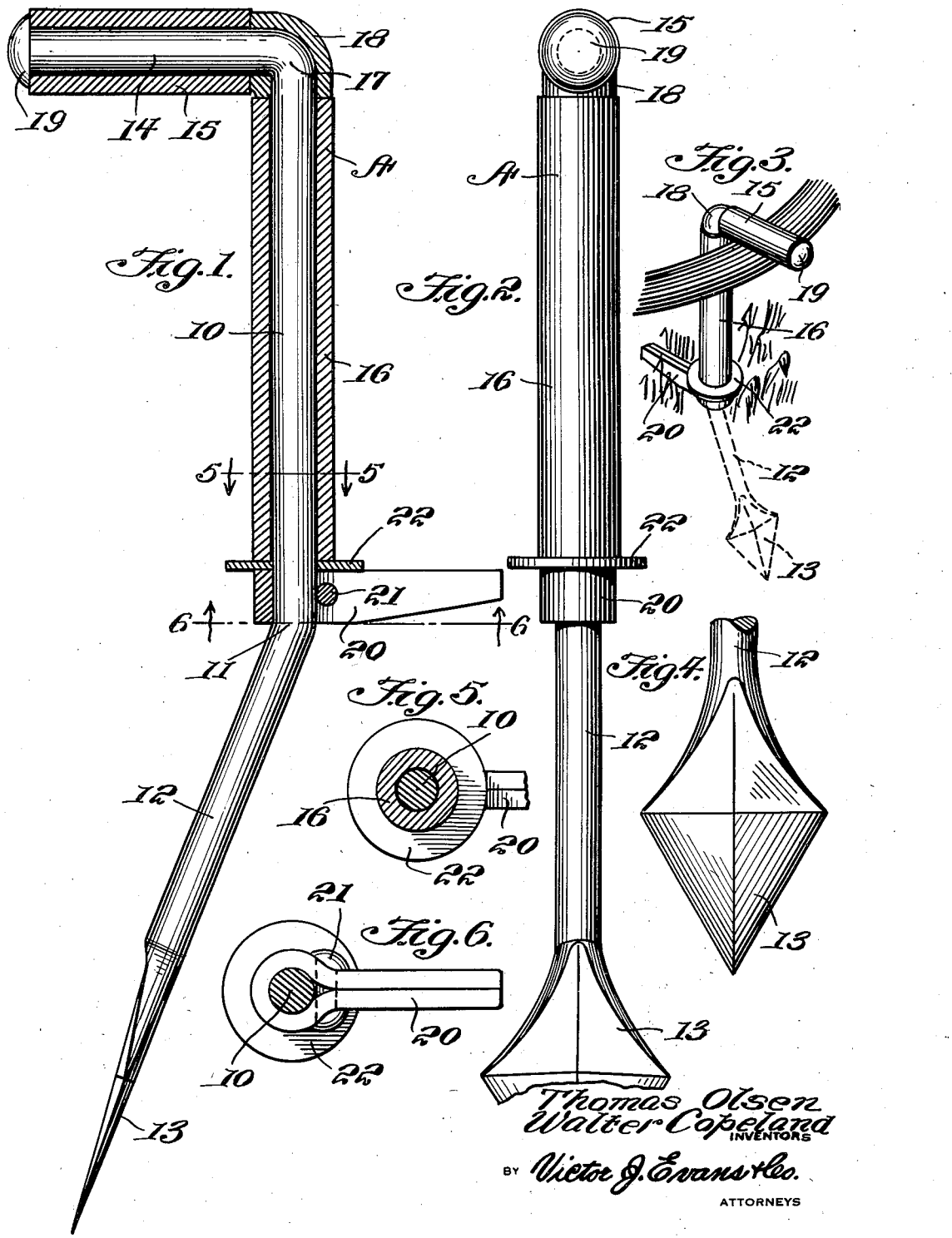
Thomas Olsen
Walter Copeland INVENTORS
BY Victor J. Evans & Co.
ATTORNEYS Patented Dec. 2, 1941

2,264,917

UNITED STATES PATENT OFFICE 2,264,917

WATER HOSE GUIDE AND PROTECTOR

Thomas Olsen and Walter Copeland,
La Junta, Colo.

Application June 17, 1940, Serial No. 341,010

7 Claims. (Cl. 47—1)

The invention relates to a garden hose guide and more especially to a water hose guide and protector device.

The primary object of the invention is the provision of an implement of this character wherein the same can be readily and easily anchored in the ground adjacent to plant beds for the purpose of guiding a garden hose automatically without requiring attention on the part of the user so that the said hose will not damage the growing plants or in any way disturb the plant bed while the hose is in use.

Another object of the invention is the provision of a device of this character wherein the construction thereof is novel in that it is useful for the guiding of a garden hose to avoid the contact thereof with growing plants in a plant bed or getting entangled with an obstruction which would interfere with the use of the hose for watering purposes, the said device being also designed to avoid unnecessary wear upon the hose through frictional wear thereon when it is drawn to reach portions of a garden or ground area remote from the water supply point for such hose.

A further object of the invention is the provision of a device of this character wherein when the hose is engaged therewith there is no liability of th same becoming accidentally disengaged therefrom and when so engaged will be conveniently guided when pulled along upon the ground for watering purposes.

A still further object of the invention is the provision of a device of this character wherein the same can be utilized as a garden implement for the extracting or removal of dandelions, weeds or other obnoxious growths or undesirable plants from a lawn, plant bed or the like.

A still further object of the invention is the provision of a device of this character, which is simple in its construction, readily and easily anchored in the ground, thoroughly reliable and efficient in operation, affording protection to growing plants and a garden hose in the use of the latter, susceptible of service for removing dandelions or other undesirable plants from a ground area, being easily driven into the ground for anchorage thereof in place, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is an elevation partly in section of a device constructed in accordance with the invention.

Figure 2 is a fragmentary elevation of the same, viewed in a position at substantially right angles to the position shown in Figure 1.

Figure 3 is a perspective view of a device when anchored in the ground for guiding and protecting a hose and growing plants.

Figure 4 is a fragmentary plan view of the blade tip of the device.

Figure 5 is a sectional view taken on the line 5—5 of Figure 1 looking in the direction of the arrows.

Figure 6 is a sectional view taken on the line 6—6 of Figure 1 looking in the direction of the arrows.

Similar reference characters indicate corresponding parts throughout the several views in the drawing.

Referring to the drawing in detail, A designates generally the device constituting the present invention for service as a hose guide and also for protection of growing plants. This device A comprises a rodlike shank 10, preferably made from metal, and is formed with a bight 11 creating a lower anchoring portion 12 angled to the vertical resultant from the bight 11. This anchoring portion 12 is provided with a substantially diamond-shaped, bladelike, piercing tip 13 presenting a sharp-edged, spatulate point so that the device A can be driven into the ground in a convenient manner for the anchorage thereof therein. This tip 13 is also susceptible for removing dandelions, weeds or other undesirable plants from the soil, particularly on lawns, plant beds or the like. The portion 12, when driven into the ground, has the ground level reaching the bight 11 in said device or the shank 10 thereof.

The shank 10 is formed with a lateral upper end 14, which is at substantially right angles to the straight portion of said shank 10, and journaled on this end 14 and the said straight portion of the shank 10 are the sleeve-like rollers 15 and 16, respectively. These rollers 15 and 16 are separated from each other at the bend 17 extending the end 14 at right angles to the straight portion of said shank by an elbowlike spacer fitting 18.

The end 14 is provided with an enlarged terminal head 19 which retains the roller 15 journaled upon this end 14 while the spacing between the roller 15 and the roller 16 is maintained by the fitting 18.

Next to the bight 11 and encircling the shank 10 is a foot stirrup 20, being formed from a single straplike piece of metal turned about the shank 10 and riveted at 21 for securely fastening the said stirrup 20 to the shank. Interposed between the roller 16 and the stirrup 20 is a washer 22. The purpose of the stirrup 20 is to enable foot pressure to be applied to the device A for the anchoring of the said device in the ground in a manner as is clearly shown in Figure 3 of the drawing. When so anchored the said device A enables a hose, a portion thereof being indicated at B, to be trained by such device for the guiding of the hose when being pulled upon so that such hose will not engage with shrubs, growing plants or the like, particularly when the said hose is carried adjacent to a plant bed, the hose B being also protected in that frictional wear thereon by the device when guiding the same is reduced to a minimum.

When the hose B is engaged with the device A, there is no liability of the said hose riding off of the device, and when such hose contacts with the rollers 15 and 16, these rotate minimizing frictional wear upon the hose when being pulled upon for the drawing out thereof to reach portions of a garden more or less remote from the water supply point to which the hose is attached.

The angular disposition of the portion 12 of the shank 10 is in the same direction to the bend or disposition of the end 14 on which the roller 15 is journaled. This end 14 with the roller 15 thereon constitutes a hand grip when the device A is utilized for extracting or removing undesirable plants from the ground when the said device has been released from anchorage in the same.

What is claimed is:

1. A device of the kind described comprising a shank having a straight portion and upper and lower angled portions with respect thereto, the upper angled portion being at substantially right angles to the said straight portion, sleevelike rollers journaled on the right angular portion and said stright portion, respectively, and a pointed bladelike tip at the terminal of the lower angular portion.

2. A device of the kind described comprising a shank having a straight portion and upper and lower angled portions with respect thereto, the upper angled portion being at substantially right angles to the said straight portion, sleevelike rollers journaled on the right angular portion and said straight portion, respectively, a pointed bladelike tip at the terminal of the lower angular portion, and a foot stirrup fixed to the straight portion of said shank next to the lower angled portion thereof.

3. A device of the kind described comprising a shank having a straight portion and upper and lower angled portions with respect thereto, the upper angled portion being at substantially right angles to the said straight portion, sleevelike rollers journaled on the right angular portion and said straight portion, respectively, a pointed bladelike tip at the terminal of the lower angular portion, a foot stirrup fixed to the straight portion of said shank next to the lower angled portion thereof, and means engaged on the shank between the sleevelike rollers for holding the same separated from each other.

4. A device of the kind described, comprising a vertical shank having an extension at its lower end and a right angle portion at its upper end, a stirrup rigidly secured to the lower end of the vertical shank, a washer surrounding the shank above the stirrup, a roller surrounding the vertical shank, and a roller surrounding the right angle portion of the shank.

5. A device of the kind described, comprising a vertical shank having an extension at its lower end and a right angle portion at its upper end, a stirrup rigidly secured to the lower end of the vertical shank, a washer surrounding the shank above the stirrup, a roller surrounding the vertical shank, a roller surrounding the right angle portion of the shank, and a curved sleeve surrounding the portion between the vertical shank and the right angle portion to form bearings for the rollers.

6. A device of the kind described, comprising a vertical shank having an extension at its lower end and a right angle portion at its upper end, a stirrup surrounding the lower end of the vertical shank and forming a stop, a washer surrounding the shank above the stirrup, a roller surrounding the vertical shank, a roller surrounding the right angle portion of the shank, and a curved sleeve surrounding the portion between the vertical shank and the right angle portion to form bearings for the rollers.

7. A device of the kind described comprising a shank portion and a connected ground penetrating stem, a sleevelike roller journaled on the shank portion, and a rotatable laterally extending guard at the upper end of the shank portion to be engaged by the hose and retain the latter on the sleevelike roller.

THOMAS OLSEN.
WALTER COPELAND.